United States Patent
Shibaya

(10) Patent No.: US 8,740,231 B2
(45) Date of Patent: Jun. 3, 2014

(54) LIGHT-ALLOY VEHICLE SUSPENSION MEMBER

(71) Applicant: Suzuki Motor Corporation, Shizuoka-ken (JP)

(72) Inventor: Takao Shibaya, Shizuoka-Ken (JP)

(73) Assignee: Suzuki Motor Corporation (JP)

( * ) Notice: Subject to any disclaimer, the term of this patent is extended or adjusted under 35 U.S.C. 154(b) by 0 days.

(21) Appl. No.: 13/797,141

(22) Filed: Mar. 12, 2013

(65) Prior Publication Data

US 2013/0241186 A1    Sep. 19, 2013

(30) Foreign Application Priority Data

Mar. 14, 2012 (JP) ................... 2012-057001

(51) Int. Cl.
  *B60G 7/02* (2006.01)
  *B62D 21/00* (2006.01)
(52) U.S. Cl.
  CPC ..................... *B62D 21/00* (2013.01)
  USPC .................. 280/124.109; 296/204
(58) Field of Classification Search
  CPC ........ B62D 21/00; B62D 21/06; B62D 21/07; B62D 21/10; B62D 25/20; B62D 29/00
  USPC ................... 280/124.109; 296/204
  See application file for complete search history.

(56) References Cited

U.S. PATENT DOCUMENTS

| | | | | |
|---|---|---|---|---|
| 3,202,451 | A | * | 8/1965 | Auger et al. ............. 296/204 |
| 3,419,303 | A | * | 12/1968 | Eggert, Jr. et al. ......... 296/204 |
| 4,014,588 | A | * | 3/1977 | Kohriyama ............. 296/35.1 |
| 6,666,501 | B1 | * | 12/2003 | Logan et al. ............. 296/193.07 |
| 2007/0107368 | A1 | * | 5/2007 | Ruehl ................ 52/731.2 |
| 2013/0205591 | A1 | * | 8/2013 | Santini et al. ............ 29/897.2 |
| 2013/0320715 | A1 | * | 12/2013 | Greven et al. ........... 296/204 |

FOREIGN PATENT DOCUMENTS

| | | |
|---|---|---|
| JP | 08-198134 | 8/1996 |
| JP | 3175523 B | 8/1996 |
| JP | 2007-253642 | 10/2007 |

* cited by examiner

*Primary Examiner* — Karen Beck
(74) *Attorney, Agent, or Firm* — Lerner, David, Littenberg, Krumholz & Mentlik, LLP

(57) ABSTRACT

A light-alloy vehicle suspension member integrally made from a light alloy, including a sectional shape formed by an upper wall, a front wall, and a rear wall so as to have an open bottom, the upper wall being substantially horizontal, the front wall and the rear wall being erected in a substantially vertical manner on a front edge and a rear edge of the upper wall respectively, wherein: one end of a torque rod is connected to a center portion, in a vehicle width direction, of the upper wall, another end of the torque rod is connected to an engine; a vertical position of the upper wall substantially corresponds to a vertical center position between the front wall and the rear wall, and substantially corresponds to a height position of the torque rod.

4 Claims, 4 Drawing Sheets

LIGHT-ALLOY VEHICLE SUSPENSION MEMBER

CROSS-REFERENCE OF RELATED APPLICATION

The present application claims priority from Japanese Patent Application No. 2012-057001 filed Mar. 14, 2012, the disclosure of which is hereby incorporated herein by reference.

TECHNICAL FIELD

The present invention relates to a light-alloy vehicle suspension member being arranged below an engine compartment of a vehicle and supporting suspension arms so as to be capable of swinging in an upper and lower direction at both left and right ends of the engine compartment.

BACKGROUND ART

An engine of a drive source, arranged in an engine compartment in a front portion of a vehicle, is elastically supported on a vehicle body by a plurality of engine mounts. The engine tends to oscillate based on torque fluctuations or rotation fluctuations which result from throttle manipulation or the like, and the engine oscillates with respect to the vehicle body by an amount equivalent to elastic deformation of the engine mounts which are installed to prevent engine vibrations from being transmitted to the vehicle body. Thus, the engine and suspension member are connected by a torque rod to reduce engine oscillations.

Incidentally, the suspension member connected with one end of the torque rod, is arranged below the engine compartment of the vehicle, this suspension member supports suspension arms so as to be capable of swinging in an upper and lower direction at the left and right ends of the engine compartment respectively, and the suspension member connects a pair of apron side members which are arranged on left and right sides of the engine compartment respectively, along a front and rear direction of the vehicle, thereby rigidity of the vehicle body is increased.

Conventionally, the above suspension member is formed into a closed sectional shape (a hollow closed structure made by joining two case halves together) by welding press-formed sheet metal. It is common practice for a torque rod mounting portion to be installed inside such a suspension member made of sheet metal (see, for example, Patent Literature 1).

Recently, on the other hand, for the purposes of weight reduction, productivity improvement, and the like, the suspension member has come to be formed integrally by casting (such as die casting) a light alloy, such as a light-weight aluminum alloy (see, for example, Patent Literature 2).

SUMMARY OF INVENTION

Technical Problem

However, a light-alloy suspension member formed integrally by casting cannot have a closed sectional shape due to constraints in forming, and the light-alloy suspension member inevitably has a sectional shape opened downward. Consequently, there is a problem in that the suspension member has lower rigidity than a suspension member made of sheet metal, the suspension member is subjected to torsion which is caused by input from the torque rod, and movements of the engine cannot be suppressed effectively.

The present invention has been made in view of the above problem, and the present invention has an object to provide a light-alloy vehicle suspension member which can reduce torsion of the suspension member caused by input from a torque rod and thereby effectively suppress movements of the engine.

Solution to Problem

To achieve the above object, according to a first aspect of the present invention, there is provided a light alloy vehicle suspension member as follows. The light alloy vehicle suspension member integrally made from a light alloy, including a sectional shape formed by an upper wall, a front wall, and a rear wall so as to be opened downward, the upper wall being substantially horizontal, and the front wall and the rear wall being erected in a substantially vertical manner on a front edge and a rear edge of the upper wall respectively, wherein one end of a torque rod is connected to a center portion, in a vehicle width direction, of the upper wall, and another end of the torque rod is connected to an engine; a vertical position of the upper wall substantially corresponds to a vertical center between the front wall and the rear wall, and substantially corresponds to a height position of the torque rod; and the light alloy vehicle suspension member has a substantially H-shape form in a longitudinal section along a front and rear direction of the vehicle.

According to a second aspect of the present invention, the first aspect of the present invention is characterized in that a torque rod mounting portion of the upper wall bulges upward from the upper wall, and a housing portion for a mount of the torque rod is formed on a lower part of the torque rod mounting portion.

According to a third aspect of the present invention, the second aspect of the present invention is characterized in that vertical ribs connecting the front wall and rear wall are installed on left and right parts of the torque rod mounting portion respectively, the vertical ribs are projected substantially vertically from a lower surface of the upper wall, and the housing portion is configured by the vertical ribs, the front wall, and the rear wall.

According to a fourth aspect of the present invention, the third aspect of the present invention is characterized in that diagonal ribs are installed so as to be projected substantially vertically from the lower surface of the upper wall, the diagonal ribs extend obliquely outward in the vehicle width direction from connecting portions in which the left and right vertical ribs are connected to the front wall and the rear wall, and triangular spaces which are formed with a triangular shape when seen from an upper direction of the vehicle and are opened downward, are formed on the left and right parts of the torque rod mounting portion respectively by the diagonal ribs, the vertical ribs, and the upper wall.

Advantageous Effects of Invention

According to a first aspect of the present invention, the suspension member has a substantially H-shape form in a longitudinal section along the front and rear direction of the vehicle so that section modulus thereof is increased, and thus, rigidity of the suspension member is enhanced. Since the vertical position of the upper wall of the suspension member is set substantially equal to the height position of the torque rod, the upper wall of the suspension member is arranged at a position of input from the torque rod in the front and rear direction of the vehicle when viewed from a side of the vehicle, and thus, input from the torque rod using the upper wall can be received effectively. This makes it possible to reduce torsion of the suspension member which is caused by input from the torque rod, and thereby movement of the engine can be suppressed effectively.

According to the second aspect of the present invention, the housing portion for the torque rod mount can be formed easily on the upper wall of the suspension member, and thus, the torque rod can be arranged appropriately.

According to the third aspect of the present invention, the vertical ribs form the housing portion for use to house the suspension member, and the torque rod mounting portion on the upper wall can be reinforced effectively by the vertical ribs on both the left and right sides.

According to the fourth aspect of the present invention, triangular spaces which are formed with a triangular shape when seen from an upper direction of the vehicle and are opened downward are formed on the left and right parts of the torque rod mounting portion respectively by the diagonal ribs, the vertical ribs, and the upper wall, the diagonal ribs and vertical ribs are installed so as to be projected from the upper wall of the suspension member, and thus, the torque rod mounting portion on the upper wall can be reinforced more effectively.

DESCRIPTION OF EMBODIMENTS

An embodiment of the present invention will be described below with reference to the accompanying drawings.

Figure 1:
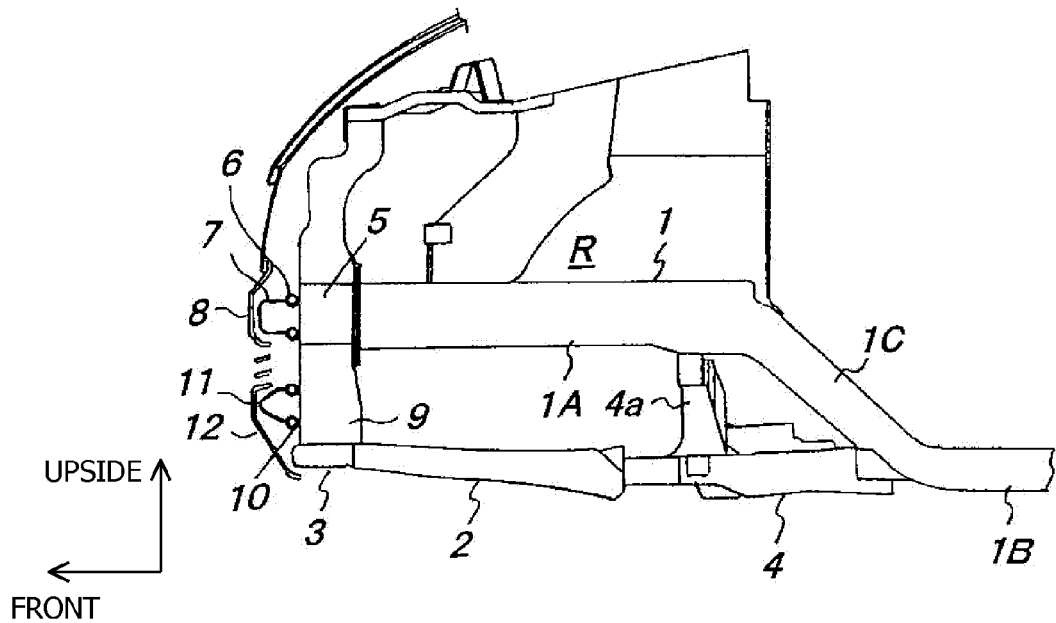
FIG. 1 is a side view showing a front body structure of a vehicle.

FIG. 1 is a side view showing a front body structure of a vehicle. As shown in FIG. 1, in an engine compartment R positioned in a front portion of the vehicle, a pair of left and right apron side members 1 (only one of which is shown in FIG. 1) are disposed along a front and rear direction of the vehicle (in a left and right direction in FIG. 1), and a pair of left and right lower apron members 2 (only one of which is shown in FIG. 1) are disposed below the apron side members 1 along the front and rear direction of the vehicle. At front ends of the pair of left and right lower apron members 2, a radiator support member 3 is constructed in a vehicle width direction (in the direction perpendicular to the plane of the paper in FIG. 1). A light-alloy vehicle suspension member (hereinafter referred to simply as the "suspension member") 4 according to the present invention is connected to rear ends of the lower apron members 2 by being placed in a lower portion of the engine compartment R.

Each apron side member 1 includes a first horizontal portion 1A and a second horizontal portion 1B which are arranged one behind the other, as well as a diagonal portion 1C adapted to couple together the two horizontal portions 1A and 1B. A crush box 5 configured so as to deform and thereby absorb shock, is arranged at a front end of the apron side member 1. An upper bumper member 7 equipped with a pair of upper and lower pipe sections 6 arranged along the vehicle width direction, is connected to the front ends of the left and right crush boxes 5, and a bumper fascia 8 is disposed forward of the upper bumper member 7 with respect to the vehicle.

Respective ramp support braces 9 which extend vertically, are attached to inner faces of the pair of left and right crush boxes 5 in the vehicle width direction. A lower bumper member 11 equipped with a pair of upper and lower pipe sections 10 which are arranged along the vehicle width direction, is connected to front ends of the two ramp support braces 9, and a bumper fascia 12 is disposed forward of the lower bumper member 11 with respect to the vehicle. The bumper fascias 8, 12 are constructed integrally while a radiator air intake port is arranged between the bumper fascias 8, 12.

Next, detailed configuration of the suspension member 4 according to the present invention will be described below with reference to FIGS. 2 to 7.

Figure 2:
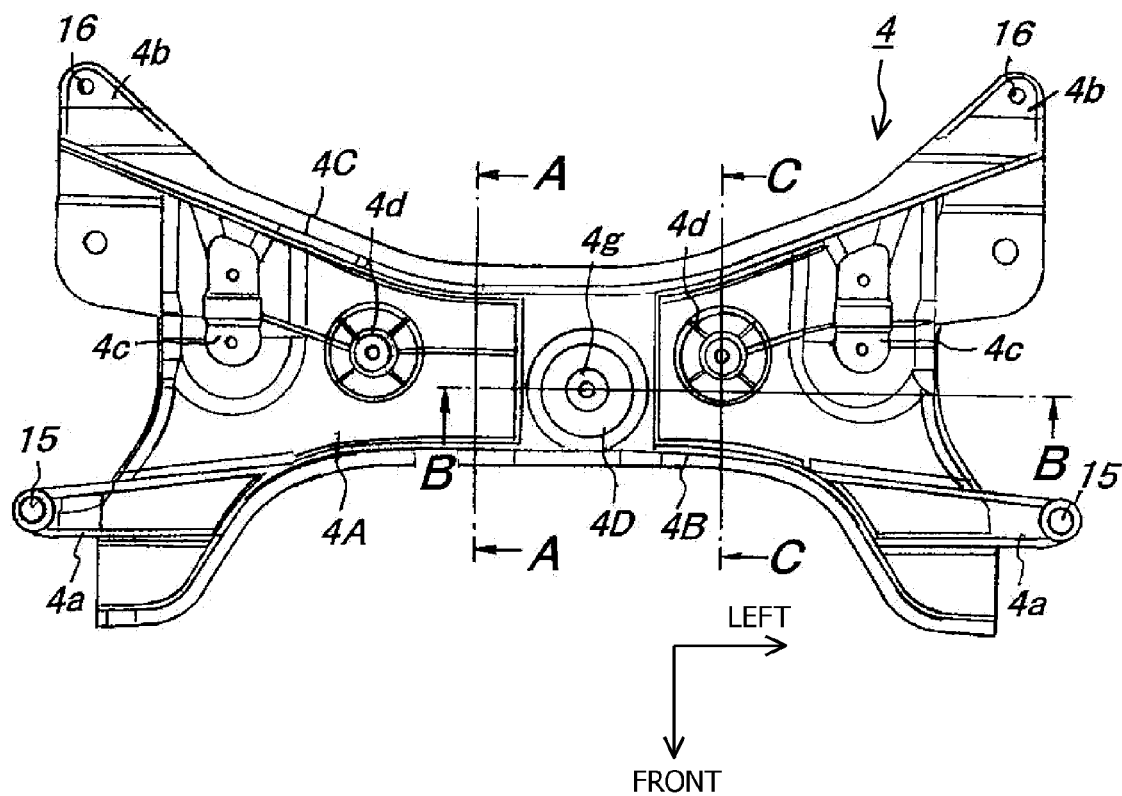
FIG. 2 is a plan view of a light-alloy vehicle suspension member according to the present invention.
Figure 3:
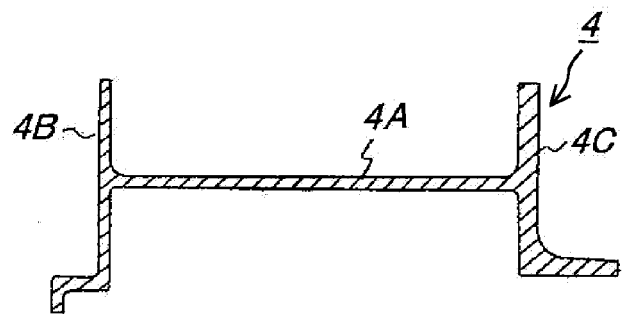
FIG. 3 is a sectional view taken along line A-A in FIG. 2.
Figure 4:
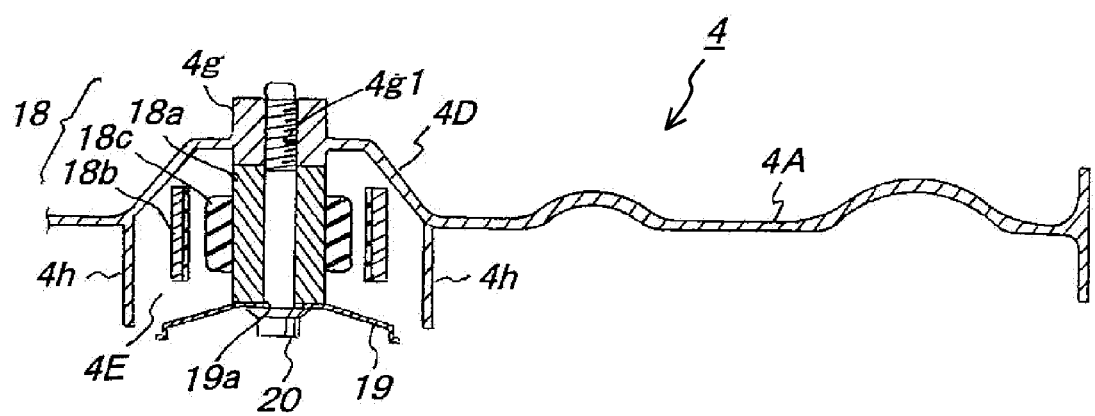
FIG. 4 is a sectional view taken along line B-B in FIG. 2.
Figure 5:
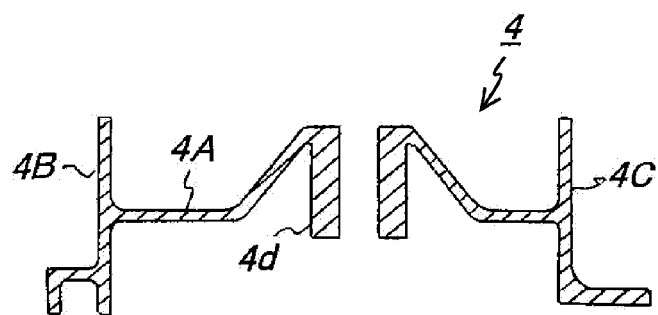
FIG. 5 is a sectional view taken along line C-C in FIG. 2.
Figure 6:
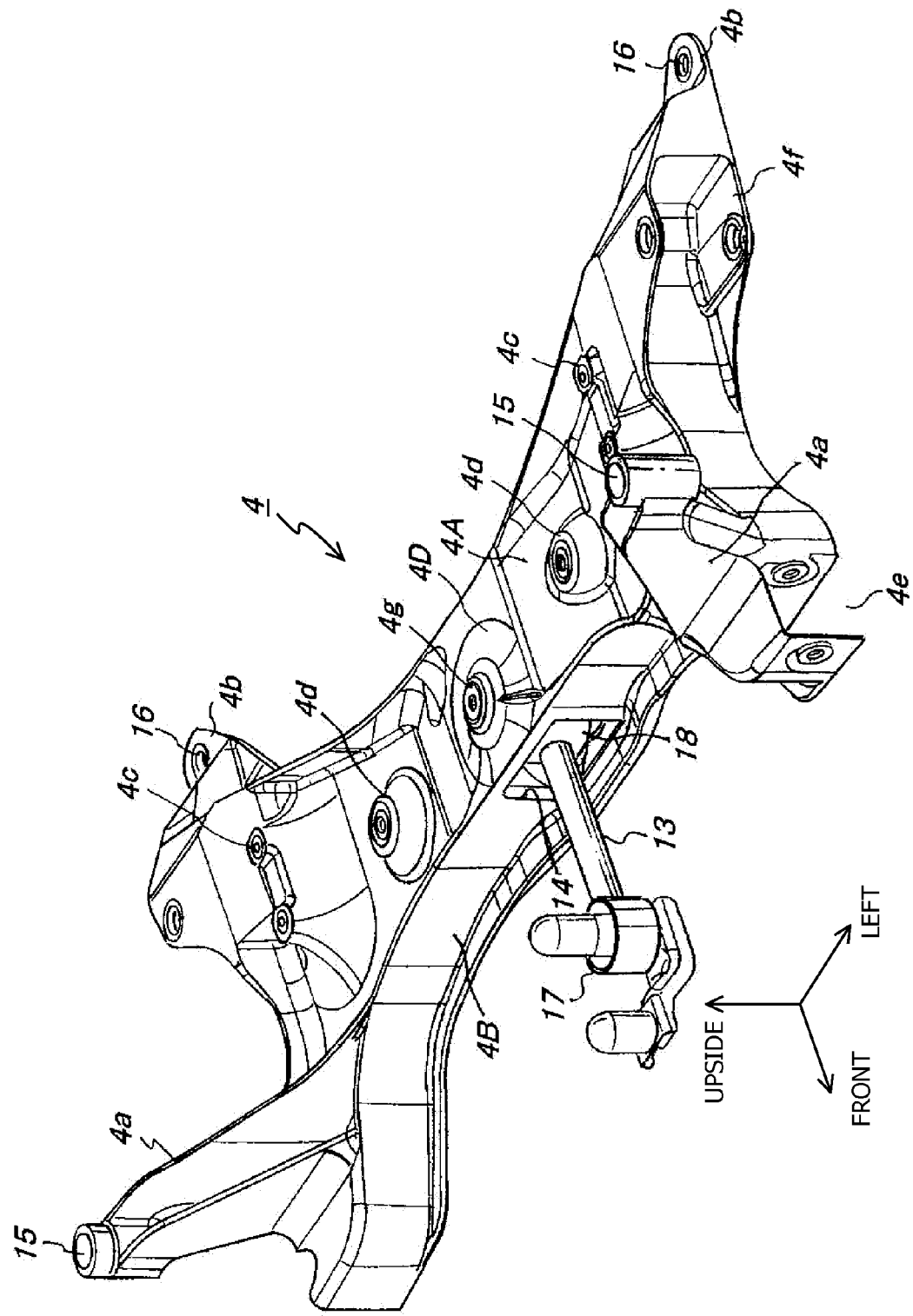
FIG. 6 is a perspective view of the light-alloy vehicle suspension member according to the present invention as viewed obliquely from above.
Figure 7:
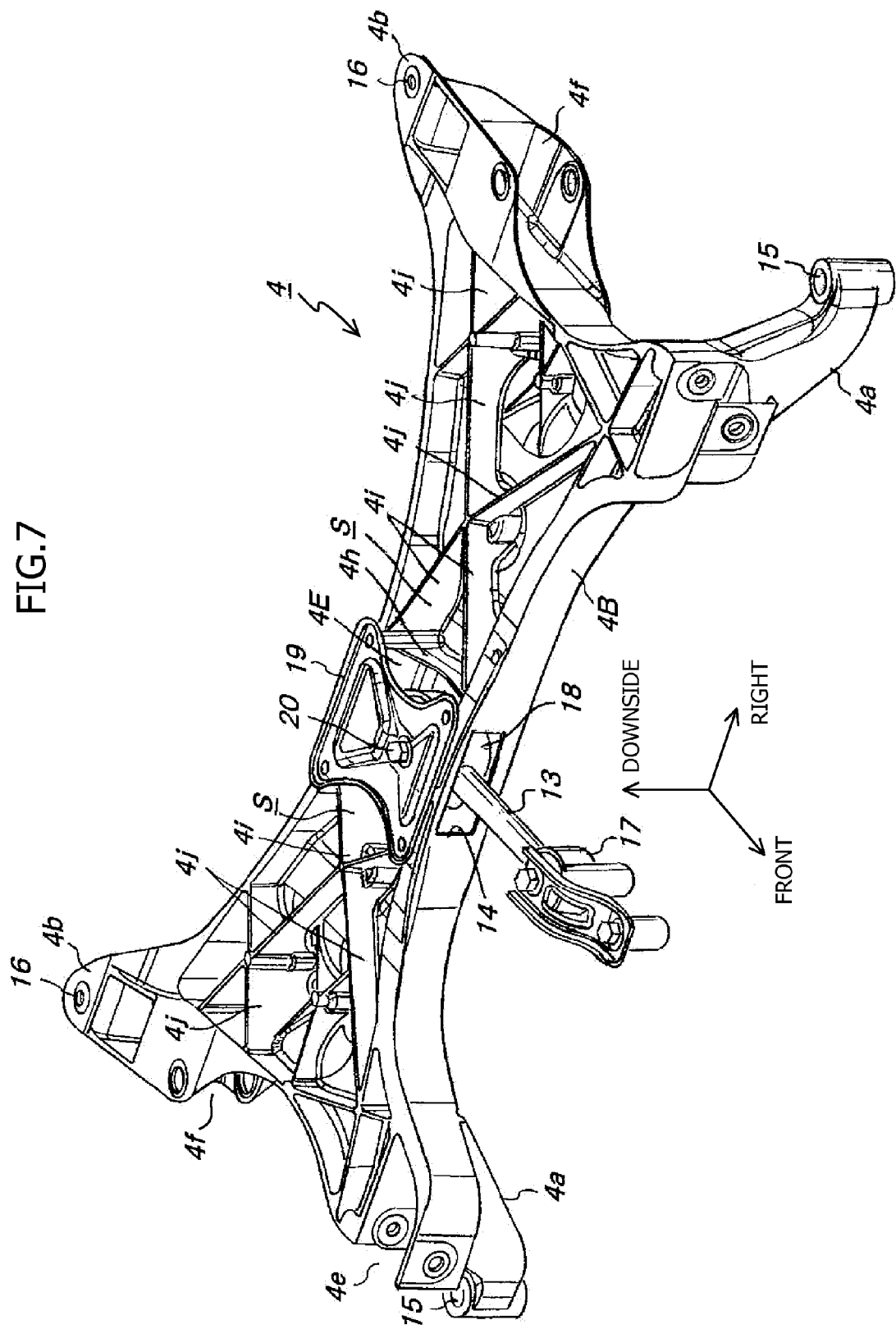
FIG. 7 is a perspective view of the light-alloy vehicle suspension member according to the present invention as viewed obliquely from below.

FIG. 2 is a plan view of the suspension member according to the present invention, FIG. 3 is a sectional view taken along line A-A in FIG. 2, FIG. 4 is a sectional view taken along line B-B in FIG. 2, FIG. 5 is a sectional view taken along line C-C in FIG. 2, FIG. 6 is a perspective view of the suspension member as viewed obliquely from above, and FIG. 7 is a perspective view of the suspension member as viewed obliquely from below.

The suspension member 4 is formed integrally by casting (such as die casting) a light alloy such as an aluminum alloy and provided with a sectional shape formed by an upper wall 4A, front wall 4B, and rear wall 4C so as to be opened downward, in the suspension member 4, the upper wall 4A is configured to be substantially horizontal, and the front wall 4B and rear wall 4C erected in a substantially vertical manner on a front end and rear end of the upper wall 4A respectively. As shown in FIGS. 6 and 7, in the suspension member 4, a rectangular through-hole 14 is formed in a center portion, in the vehicle width direction, of the front wall 4B such that a torque rod 13 which extends substantially horizontally toward rear part of the vehicle from an engine (not shown), can be passed through the suspension member 4.

Thus, as shown in FIG. 3, in the suspension member 4 according to the present invention, a vertical position of the upper wall 4A is set substantially equal to a vertical center between the front wall 4B and rear wall 4C, and is set substantially equal to height position of the torque rod 13. The suspension member 4 has a substantially H-shape form in longitudinal section (lateral section) along the front and rear direction of the vehicle.

Incidentally, as shown in FIGS. 2 and 6, supporting columns 4a configuring a vehicle body mounting portion are erected on left and right front end sides of the upper wall 4A of the suspension member 4 respectively, and a bolt insertion hole 15 circular in shape is penetrated vertically in a front end portion of each supporting column 4a. Mounting seats 4b which similarly configuring the vehicle body mounting portion, are formed in rear corners at left and right ends of the upper wall 4A of the suspension member 4 respectively, and a bolt insertion hole 16 circular in shape is penetrated vertically in a front end portion of each mounting seat 4b.

The suspension member 4 is attached to the pair of left and right apron side members 1 shown in FIG. 1 as follows. Bolts (not shown) are passed, from below, through the bolt insertion holes 15 formed, respectively, in the left and right supporting columns 4a and fastened to lower surfaces of rear ends of the first horizontal portions 1A of the left and right apron side members 1 and bolts (not shown) are passed, from below, through the bolt insertion holes 16 which are formed in the mounting seats 4b and are fastened to rear ends of the diagonal portions 1C of the left and right apron side members 1 respectively. Incidentally, a stabilizer and a steering gear box (neither is shown) are mounted on the upper wall portion 4A of the suspension member 4, and mounting seats 4c for use to mount the stabilizer are provided integrally on left and right of the upper wall 4A of the suspension member 4 while mounting bosses 4d for use to mount the steering gear box are provided integrally on left and right on an inner side of the mounting seats 4c.

As shown in FIG. 5, a mounting part of the upper wall 4A of the suspension member 4 on which the steering gear box is mounted, bulges upward in the form of a truncated cone, and the mounting boss 4d is formed in central part of the bulging portion. That is to say, the part (some part of the upper wall 4A) on which the steering gear box is mounted, bulges upward from the surrounding part of the upper wall 4A, and a mounting surface for use to mount the steering gear box is formed on a top portion of the bulging part. The bulging shape can increase rigidity of the mounting portion and rigidity of the suspension member 4. As shown in FIG. 5, the mounting surfaces are nearly equal in a height position to upper ends of the front wall 4B and rear wall 4C. Incidentally, although a portion around only one of the mounting bosses 4d is shown in FIG. 5, the other mounting boss 4d is formed similarly. In order to further increase the rigidity of the mounting bosses 4d and rigidity of the mounting portion, inner faces of the truncated cones and outer diameters of the mounting bosses 4d extending downward may be connected to each other via ribs.

The front and rear of inner end portions in a pair of left and right suspension arms (not shown) are mounted so as to be capable of swinging in an upper and lower direction on left and right ends of the suspension member 4 respectively. As shown in FIGS. 6 and 7, gate-type mounting portions 4e opening on outer and lower sides are constructed in front side portions (lower parts of the supporting columns 4a) on left and right ends of the suspension member 4 respectively while a channel-shaped mounting portions 4f opening on outer sides are constructed in rear side portions respectively. The front and rear of the inner end portions of the left and right suspension arms are mounted on the front and rear mounting portions 4e, 4f via illustrated rubber bushings in a condition in which the left suspension arm is mounted on the left mounting portion and the right suspension arm is mounted on the right mounting portion. The suspension arms are configured to be swingable in the upper and lower direction via elastic deformation of the rubber bushings. Incidentally, although not illustrated, an outer end portion of each suspension arm is pivotally mounted on a front wheel knuckle via a ball joint, left and right front wheels are rotatably supported by the respective front wheel knuckles, and end portions of tie rods extending to left and right from the steering gear box are connected to the front wheel knuckles via ball joints.

Next, a mounting structure used to mount the torque rod 13 on the suspension member 4 will be described.

As shown in FIGS. 6 and 7, the torque rod 13 is arranged at the center, in the vehicle width direction, of the suspension member 4 along the front and rear direction, and adapted to limit engine oscillations by connecting the suspension member 4 to the engine (not shown) which is placed ahead of the suspension member 4. A front end of the torque rod 13 is attached to the engine via a mount 17 while a rear end of the torque rod 13 is attached to the suspension member 4 similarly via a mount 18.

As shown in FIG. 4, a torque rod mounting portion 4D is formed in a center portion, in the vehicle width direction, of the upper wall 4A of the suspension member 4 so as to bulge upward, and a mounting boss 4g is formed at the center of the torque rod mounting portion 4D. That is to say, the torque rod mounting portion 4D (part of the upper wall 4A) bulges upward from the surrounding part of the upper wall 4A in the form of a truncated cone, and the mounting boss 4g is formed on a top portion of the bulging part. Left and right vertical ribs 4h adapted to couple the front wall 4B and rear wall 4C to each other, are formed around the torque rod mounting portion 4D, by integrally projecting downward from an lower surface of the upper wall 4A. While being surrounded by the left and right vertical ribs 4h, front wall 4B, and rear wall 4C, a housing portion 4E opened downward is formed to house the mount 18 on the rear end of the torque rod 13.

More particularly, the upper wall 4A around the truncated cone-shaped bulge is configured to be nearly equal in a height position to the upper ends of the front wall 4B and rear wall 4C, and the upper wall 4A is adapted to couple the upper end of the front wall 4B and upper end of the rear wall 4C to each other. Lower edges of the vertical ribs 4h are located at a higher level than lower ends of the front wall 4B and rear wall 4C, and the lower edges configured to extend along the front and rear direction of the vehicle by passing through a boundary portion between the truncated cone-shaped bulging portion and the upper wall 4A around it. The upper wall 4A is configured to slope down from a connecting portion between the upper wall 4A and vertical ribs 4h toward flanks of the vehicle, and the slope of the upper wall 4A connects a surrounding portion of the upper wall 4A which surrounds the truncated cone-shaped bulging portion, with a center portion of the upper wall 4A which is located approximately in the vertical center between the front wall 4B and rear wall 4C.

According to the illustrated present embodiment, the truncated cone-shaped bulges can improve the rigidity of the torque rod mounting portion 4D and rigidity of the suspension member 4. The mounting boss 4g is nearly equal in a height position to the upper ends of the front wall 4B and rear wall 4C, and the upper end of the mounting boss 4g is projected above the upper ends of the front wall 4B and rear wall 4C in terms of the height position. Incidentally, the bulging part formed to provide the housing portion 4E below it does not necessarily need to have a truncated cone shape, and the bulging part may be formed by sloping the upper wall 4A in such a way as to be higher toward the torque rod mounting portion 4D. Furthermore, the upper wall 4A may be configured to bulge upward in terms of position by putting up a vertical wall on the upper wall 4A in such a way as to be continuous with the vertical ribs 4h.

As shown in FIG. 7, on the left and right sides of the housing portion 4E on a back face of the suspension member 4, diagonal ribs 4i are installed so as to be projected substantially vertically from the lower surface of the upper wall 4A, while extending obliquely outward in the vehicle width direction from connecting portions in which the left and right vertical ribs 4h are connected to the front wall 4B and rear wall 4C. Triangular spaces S which are formed in a triangular shape when seen from an upper direction of the vehicle and are opened downward, are formed on left and right of the torque rod mounting portion 4D respectively by the diagonal ribs 4i, vertical ribs 4h, and upper wall 4A.

Since the respective triangular spaces S are formed on the left and right of the torque rod mounting portion 4D (housing portion 4E), the torque rod mounting portion 4D on the upper wall can be reinforced more effectively. Furthermore, the upper part of the triangular spaces S are provided by the sloping upper wall 4A, and thus, rigidity is improved. One of the diagonal ribs 4i extending from the connecting portions in which the front ends of the vertical ribs 4h are connected to the front wall 4B, and another of the diagonal ribs 4i extending from the connecting portions in which the rear ends of the vertical ribs 4h are connected to the rear wall 4C, extend obliquely outward in the vehicle width direction, and are connected on the back side of the steering gear box mounting portions which bulge upward in the form of truncated cones. That is to say, the diagonal ribs 4i reinforce the mounting portions for the steering gear box. Furthermore, on outer sides of the left and right diagonal ribs 4i on the back face of the suspension member 4, by continuing from the ribs 4i, a plural of diagonal ribs 4j similarly are projected in a substantially vertical manner from the lower surface of the upper wall 4A, and each diagonal rib 4i is formed in a grid pattern.

Thus, of torque rod 13, the mount 18 on the rear end is passed through the through-hole 14 which is formed in the front wall 4A of the suspension member 4, from the forward side of the vehicle, and the mount 18 is housed in the housing portion 4E as shown in FIG. 4. Incidentally, the mount 18 is configured by filling elastic material 18c, such as rubber, into a space between an inner cylinder 18a and outer cylinder 18b which are made of metal and are arranged concentrically.

Incidentally, as shown in FIG. 7, in order to cover the housing portion 4E from below, a connecting plate 19 is constructed between the lower surfaces of the front wall 4B and rear wall 4C, and four corners are bolted to the lower surface of the suspension member 4 in which the housing portion 4E opens (bolts not shown).

More particularly, as shown in FIG. 7, the connecting plate 19 is fastened to a boss using bolts (not shown), the boss being formed in the connecting portions in which the front ends of the vertical ribs 4h are connected to the front wall 4B, and the connecting portions in which the rear ends of the vertical ribs 4h are connected to the rear wall 4C. The connecting portions are also connected to the diagonal ribs 4i, and thus, rigidity of the boss is increased. A bolt insertion hole 19a circular in shape has been formed in a center portion of the connecting plate 19 as shown in FIG. 4. A bolt 20 to be passed into the bolt insertion hole 19a from below is passed through the inner cylinder 18a of the mount 18. A threaded front portion of the bolt is screwed into a screw hole 4g1 of the mounting boss 4g which is formed on the upper wall 4A of the suspension member 4, and as a result, the rear end of the torque rod 13 is mounted in a center portion, in the vehicle width direction, of the suspension member 4 via the mount 18. When the rear end portion of the torque rod 13 is attached to the suspension member 4 by being fastened together with the connecting plate 19 by bolt 20 in this way, the bolt 20 is supported at both upper and lower ends by the upper wall 4A of the suspension member 4 and the connecting plate 19, and thus, the rear end portion of the torque rod 13 is securely attached to the suspension member 4 via the mount 18, and thereby falling of the bolt 20 is prevented. Incidentally, although not illustrated, a front end portion of the torque rod 13 is attached to the engine via a mount 17.

As described above, according to the present embodiment, the suspension member 4 is configured to have a substantially H-shape form in a longitudinal section (lateral section) along the front and rear direction of the vehicle as shown in FIG. 3 so that the section modulus is increased, and thereby the rigidity of the suspension member 4 can be increased. The vertical position of the upper wall 4A of the suspension member 4 is set substantially equal to the height position of the torque rod 13, the upper wall 4A of the suspension member is arranged at a position of input from the torque rod in the front and rear direction of the vehicle when viewed from a side of the vehicle, and thus, input from the torque rod using the upper wall 4A can be received effectively. This makes it possible to reduce torsion of the suspension member 4 which is caused by input from the torque rod 13, and thereby movement of the engine can be suppressed effectively.

According to the present embodiment, the suspension member 4 is configured such that the housing portion 4E for use to house the mount 18 installed at the rear end of the torque rod 13 can be formed easily on the upper wall 4A by using the left and right vertical ribs 4h, front wall 4B, and rear wall 4C, and thus, the torque rod 13 can be arranged appropriately.

Furthermore, according to the present embodiment, the torque rod mounting portion 4D on the upper wall 4A can be reinforced effectively by both the left and right vertical ribs 4h which form the housing portion 4E of the suspension member 4. According to the present embodiment, the triangular spaces S with an open bottom are formed, respectively, on left and right of the torque rod mounting portion 4D by the diagonal ribs 4i and vertical ribs 4h installed on the lower surface of the upper wall 4A of the suspension member 4 so as to protrude therefrom as well as by the upper wall 4A, and thus, the torque rod mounting portion 4D on the upper wall 4A can be reinforced more effectively. The suspension member 4 is configured such that on the left and right of the housing portion 4E, the vertical ribs 4h and a plurality of diagonal ribs 4i and 4j are installed so as to be projected in a grid pattern from the lower surface of the upper wall 4A as shown in FIG. 7, and thus, the advantageous effect that the overall rigidity of the suspension member 4 is increased, can be obtained.

| Reference Signs List | |
|---|---|
| 4 | Suspension member |
| 4A | Upper wall of suspension member |
| 4B | Front wall of suspension member |
| 4C | Rear wall of suspension member |
| 4D | Torque rod mounting portion of suspension member |
| 4E | Housing portion of suspension member |
| 4h | Vertical rib of suspension member |
| 4i, 4j | Diagonal rib of suspension member |
| 13 | Torque rod |
| 17, 18 | Mount |
| 19 | Connecting plate |
| 20 | Bolt |
| S | Space |

The invention claimed is:

1. A light alloy vehicle suspension member integrally made from a light alloy, including a sectional shape formed by an upper wall, a front wall, and a rear wall so as to be opened downward, the upper wall being substantially horizontal, and the front wall and the rear wall being erected in a substantially vertical manner on a front edge and a rear edge of the upper wall respectively, wherein:
   one end of a torque rod is connected to a center portion, in a vehicle width direction, of the upper wall, and another end of the torque rod is connected to an engine;
   a vertical position of the upper wall substantially corresponds to a vertical center position between the front wall and the rear wall, and substantially corresponds to a height position of the torque rod; and
   the light alloy vehicle suspension member has a substantially H-shape form in a longitudinal section along a front and rear direction of the vehicle.

2. The light alloy vehicle suspension member according to claim 1, wherein a torque rod mounting portion of the upper wall bulges upward from the upper wall, and a housing portion for a mount of the torque rod is formed on a lower part of the torque rod mounting portion.

3. The light alloy vehicle suspension member according to claim 2, wherein vertical ribs connecting the front wall and the rear wall, are installed on left and right parts of the torque rod mounting portion respectively, the vertical ribs are projected substantially vertically from an lower surface of the upper wall, and the housing portion is configured by the vertical ribs, the front wall, and the rear wall.

4. The light alloy vehicle suspension member according to claim 3, wherein diagonal ribs are installed so as to be projected substantially vertically from the lower surface of the upper wall, the diagonal ribs extend obliquely outward in the vehicle width direction from connecting portions in which the left and right vertical ribs are connected to the front wall and the rear wall, and triangular spaces which are formed with a triangular shape when seen from an upper direction of the vehicle and are opened downward, are formed on the left and right parts of the torque rod mounting portion respectively by the diagonal ribs, the vertical ribs, and the upper wall.

* * * * *